INVENTOR.
BY JAMES R. HUNTLEY
Channing P. Richards &
Dalbert U. Shefte
ATTORNEYS

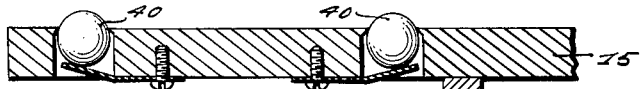
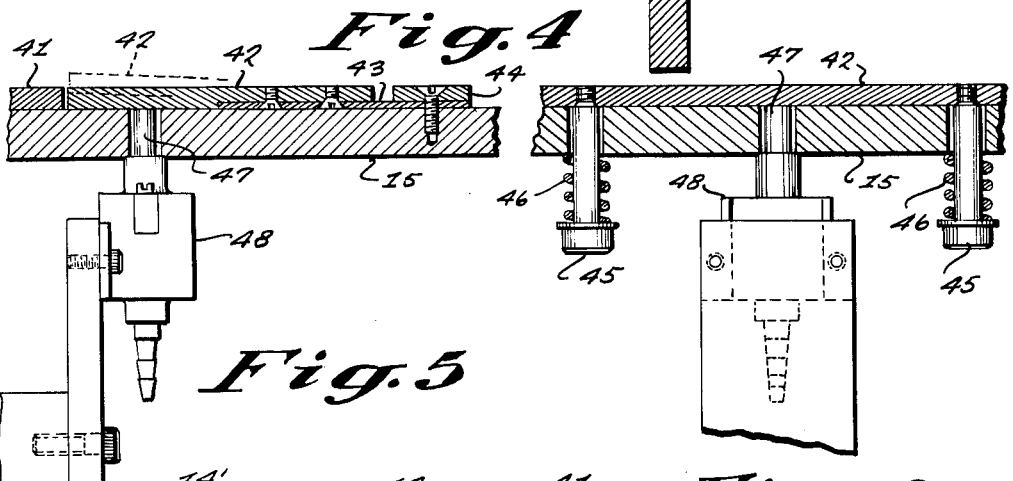
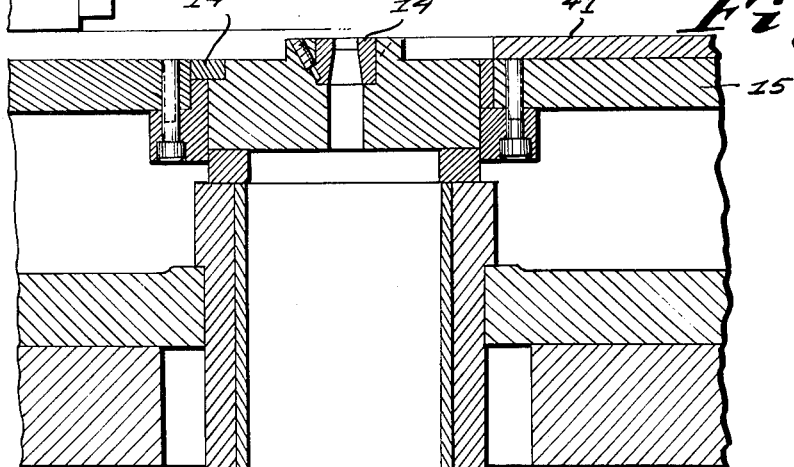
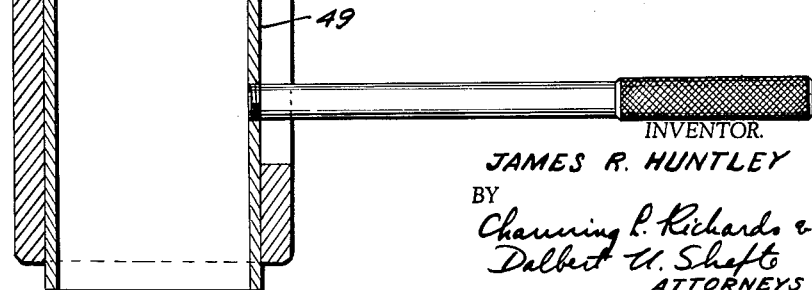

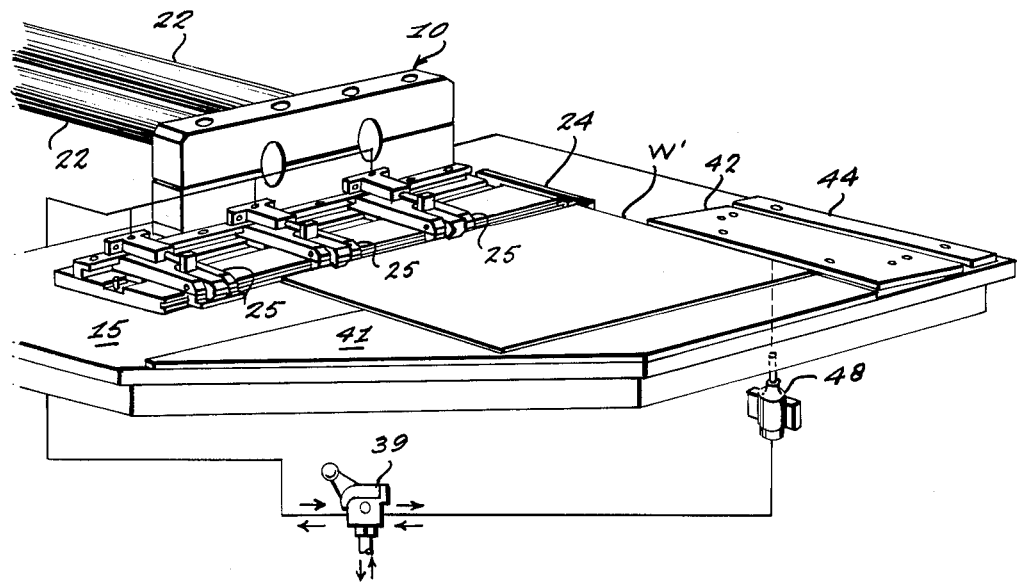
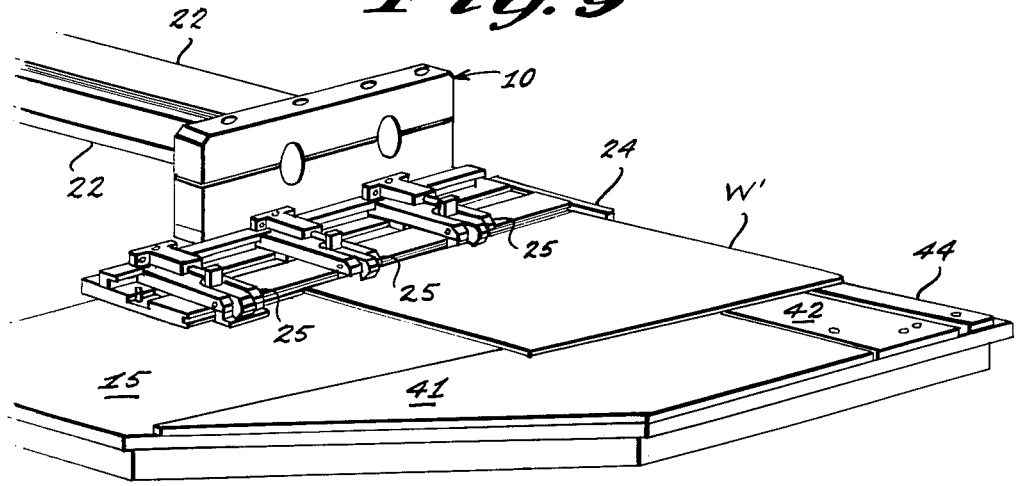

June 21, 1966 J. R. HUNTLEY 3,256,761
WORK POSITIONING MEANS
Filed Oct. 15, 1963 5 Sheets-Sheet 5
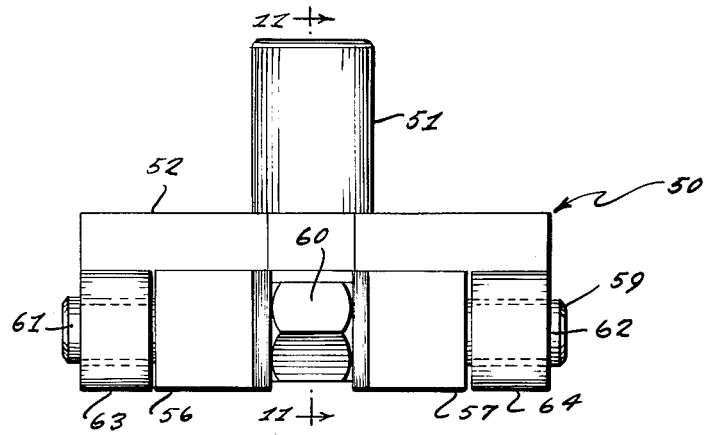
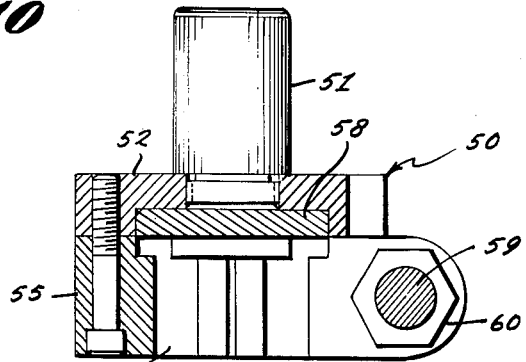
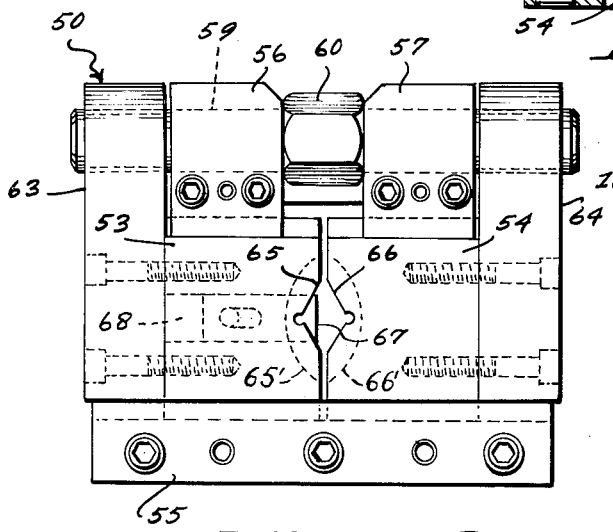
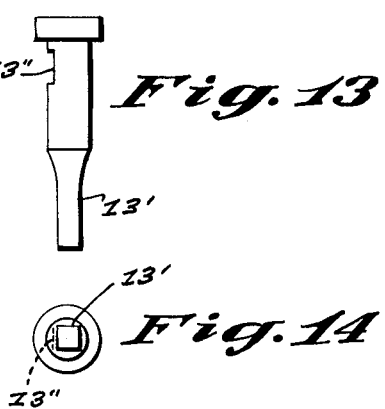
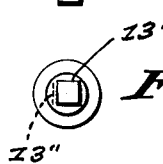
INVENTOR.
JAMES R. HUNTLEY
BY
Channing L. Richards &
Dalbert U. Shefte
ATTORNEYS

United States Patent Office 3,256,761
Patented June 21, 1966

3,256,761
WORK POSITIONING MEANS
James R. Huntley, Monroe, N.C., assignor to
Theda Paxon
Filed Oct. 15, 1963, Ser. No. 316,340
4 Claims. (Cl. 83—412)

This invention relates generally to the positioning of work to have a conforming or fashioning operation performed thereon, and more particularly to an improved work positioning means arrangement by which work may be held and positioned to excellent advantage in relation to a tool-fitted conforming unit such as a punch press.

A significant feature of this improved work positioning means arrangement is the manner in which it lends itself to effective numerically (i.e., tape) controlled X-Y (or coordinate) positioning sheet-type work for a conforming operation.

Generally characterized, the work positioning means of the present invention comprises a holding fixture supported adjacent the conforming unit by means that is X-Y shiftable for coordinate positioning of the fixture and the work held thereby, and means for controlling the shifting of the supporting means so that a desired coordinate positioning of the work is obtained. The holding fixture is arranged for gauged edge clamping of the work; provision is made for effecting the gauged edge clamping in relation to an initial alignment in either the X or Y direction; and a related alignment of the conforming tool is also provided for advantageously.

These and other features of the present invention are described at further length below in connection with the acvcompanying drawings, in which:

FIG. 4 is a second sectional detail taken substantially at the line 4—4 in FIG. 2;

FIG. 5 is a third sectional detail taken substantially at the line 5—5 in FIG. 2;

FIG. 6 is a fourth sectional detail taken substantially at line 6—6 in FIG. 2;

FIG. 7 is a fifth sectional detail taken substantially at the line 7—7 in FIG. 2;

FIG. 8 is a perspective view illustrating the function and operation of the additional aligning means provided in the work supporting table;

FIG. 9 is a related perspective view supplementing the illustration in FIG. 8;

FIG. 10 is a front elevation of an optional form of tool holder for use according to the present invention with the illustrated conforming unit in relation to the work positioning means provided;

FIG. 11 is a central sectional detail taken substantially at the line 11—11 in FIG. 10;

FIG. 12 is a bottom plan detail corresponding generally to FIG. 10;

FIG. 13 is an elevation of a punch element such as might be installed in the tool holder of FIGS. 10, 11 and 12; and FIG. 14 is a bottom plan view corresponding to FIG. 13.

Figure 1:
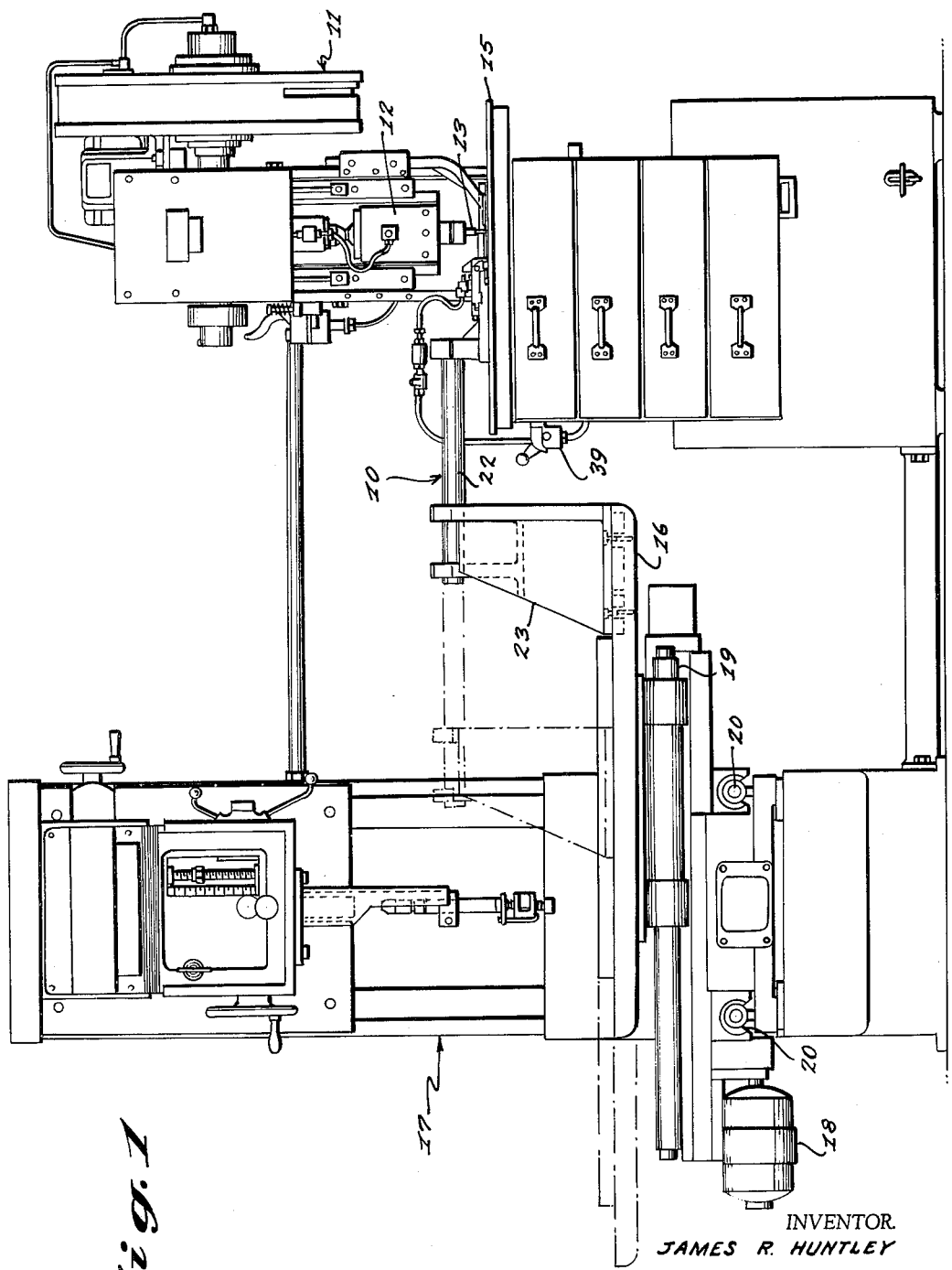
FIG. 1 is a front elevation of a representative conforming unit equipped with work positioning means in accordance with the present invention.

Referring now in detail to the drawings, and more particularly at first to FIG. 1, the reference numeral 10 indicates generally the arrangement of a work holding fixture embodying the present invention in relation to a conforming unit 11 that consists basically of a conventional punch press having a crosshead 12 arranged for fitting with a punch element 13 of a tool set completed by a die element 14 (see FIG. 7) mounted at a work supporting table portion 15 of the press 11.

The work holding fixture 10 is supported adjacent the punch press 11 for coordinate positioning by means that takes the form in the illustrated embodiment of a bed 16 of an automated drill press 17 that may be programmed for tape control of the bed positioning through a suitable motorized drive, as indicated at 18, to shift the bed 16 and work holding fixture 10 in the Y-direction on ways 19 and in the X-direction on additional ways 20, and thereby control the work holding fixture 10 in accordance with a predetermined coordinate positioning pattern.

Figure 2:
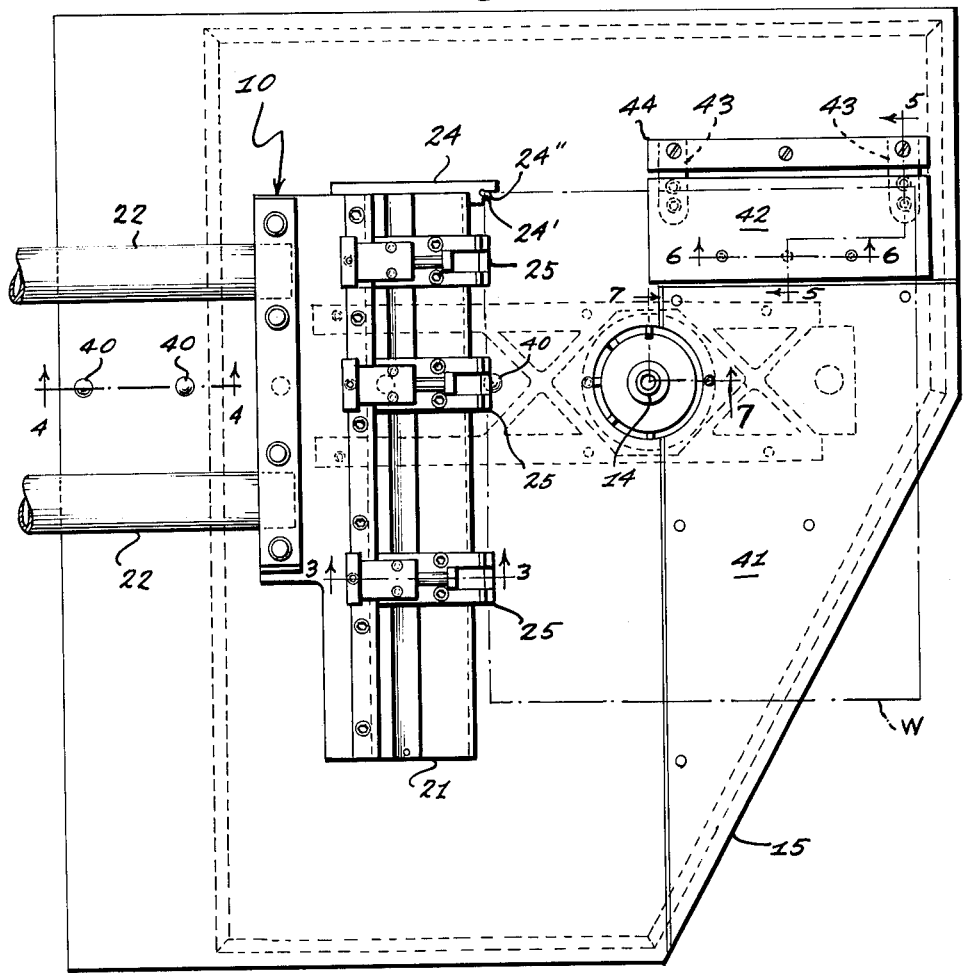
FIG. 2 is a plan detail at the work supporting table portion of the conforming unit.
Figure 3:
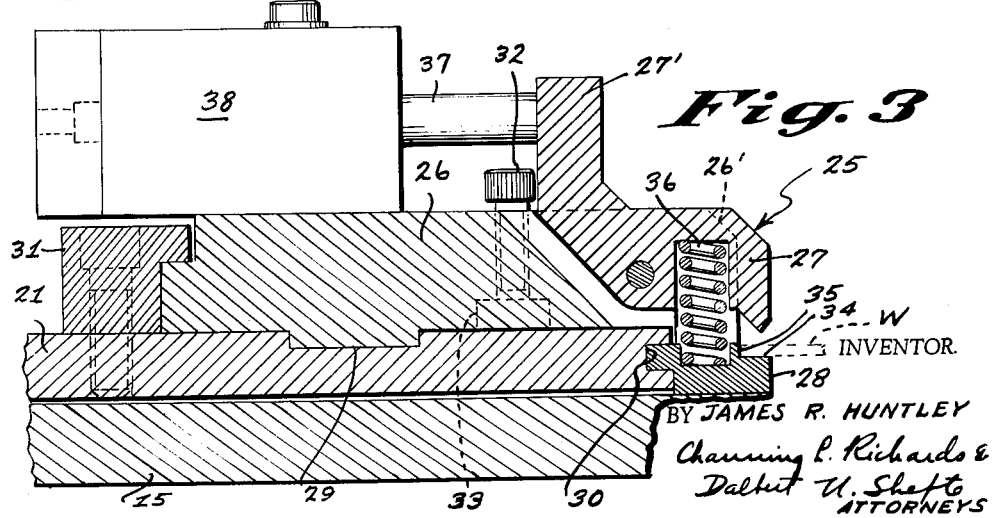
FIG. 3 is a first sectional detail taken substantially at the line 3—3 in FIG. 2.

The particular form of the work holding fixture 10 is illustrated further in FIGS. 2 and 3 as comprising a main stringer member 21 carried in cantilever fashion on rods 22 extending from an anchor bracket 23 that is secured on the drill press bed 16. At the left end of the main stringer member 21 (i.e., the top end in FIG. 2), a fixed corner gauging element 24 is installed to define, by respective right angularly related gauging faces 24′ and 24″, the zero-intersection of an X-Y system for the coordinate positioning that is to be done. Additionally, a plurality of edge clamping means 25 are aligned on the main stringer member 21 in spaced relation from the corner gauging element 21 for square positioning and clamping of an edge of a work sheet W with respect thereto.

The edge clamping means 25 each comprise a body member 26 that is formed with a forward clevis portion 26′ in which a clamping finger 27 is pivoted in relation to a lower shoe portion 28. The stringer member 21 is rabbeted lengthwise at 29 and 30 to engage each body member 26 and the shoe portion 28 thereof for slidable adjustment of its spaced positioning thereon, while a given positioning is maintained through the grip of a rear slideway 31, that is carried by the stringer member 21 for tightening commonly on all the clamping means 25, and through the forward tightening action of stud pairs 32 carried by each clamping means body member 26 to bear on lower drag elements, as indicated at 33, in set screw fashion.

The shoe portion 28 of each clamping means body member 26 rests at the top face of the punch press table portion 15 and is formed in particular to present a work supporting face at 34 that is terminated rearwardly (i.e., to the left as seen in FIG. 3) by an abutment shoulder 35 aligned in the X-direction with the face 24′ of the corner gauging element 24. The previously mentioned clamping fingers 27 are pivotally situated in each clamping means 25 for gripping an edge portion of a work sheet W (as indicated by broken lines in FIGS. 2 and 3) downwardly against the supporting face 34 of each shoe portion 28 in a manner tending also to urge the adjacent edge of the work sheet W against the abutment shoulders 35 and thereby position this edge squarely in the X-direction.

The clamping fingers 27 are biased toward an open non-gripping position by compression springs 36 that are seated on each shoe portion 28 to apply their biasing face at the adjacent active end of the fingers 27. Against this biasing face, the gripping actuation of the fingers 27 is effected through their remote shank ends 27′ by a plunger 37 of an air cylinder 38 mounted rearwardly on the body member 26 of each clamping means 25; a suitable air system being arranged through a control valve 39 (see FIG. 1) for operating the clamping means 25 as will be described further presently in connection with FIGS. 8 and 9.

As thus arranged, the several clamping means 25 grip and hold the work sheet W at a level spaced above the adjacent top surface of the punch press table portion 15, and for this reason the die 14 of the punch press tool set is arranged in table portion 15 to project at the same upwardly spaced level as seen in FIG. 7, and a related series of spring positioned ball elements is fitted in the table portion 15 (compare FIGS. 2 and 4) to counteract any tendency of a work sheet W to sag as its gripped edge portion is withdrawn from the tool set die 14 in the course of completing a full positioning pattern.

Provision is also made for alternative (or concurrent) square positioning of the work sheet W in the Y-direction in instances where the Y-dimension of the work is substantially greater than the X-dimension, or where Y-direction positioning is preferred as a matter of handling convenience. For this purpose, the punch press table portion 15 has its surface area beyond the tool set die 14 raised to the gripped level of the work sheet W by a superimposed plate member 41 (compare FIGS. 2, 5 and 7), with an additional aligning plate member 42 hinged in relation thereto towards the back of the table portion 15 (i.e., towards the top as seen in FIG. 2).

This additional aligning plate member 42 is hinged by means of leaf springs 43 secured beneath a retainer strip 44 at the surface of table portion 15 (see FIGS. 2 and 5); it is biased for normally assuming a flush disposition with respect to the adjacent table portion plate member 41 (as seen in FIG. 5) by means of depending studs 45 carrying compression springs 46 to bear against the underside of the table portion 15 (see FIG. 6); and it is displaced to a raised alignment portion (as indicated by dotted lines in FIG. 5) through the plunger 47 of an air cylinder 48 that is mounted beneath the table portion 15 as shown in FIGS. 5 and 6.

The function and operation of the aligning plate member 41 is illustrated in FIGS. 8 and 9. FIG. 8 shows the plate member 41 raised for Y-direction alignment of a work sheet W'. At this time, the previously mentioned control valve 39 for the air system will have been thrown to actuate the plate member air cylinder 48 and exhaust the clamping means air cylinder 38; the air system being connected as indicated in FIG. 8 and the control valve 39 being of the two-way type for this purpose. The clamping fingers 27 will therefore be open so that the work sheet W' may be aligned at its Y-direction edge against the raised edge of the aligning plate member 42 and located in the X-direction at the face 24' of the corner gauging elements 24 for gripping by at least two of the clamping means 25. Manipulation of the two-way control valve 39 to actuate such gripping will simultaneously exhaust the air cylinder 48 at the aligning plate member 42 and thereby allow it to resume its flush position so that subsequent coordinate positioning of the work sheet W' may take place without hindrance as illustrated in FIG. 9.

As previously noted, the present invention also provides advantageously for a related alignment of the punch press tool set in a manner that allows a rapid change of the tool elements as the need arises for punching and notching different shapes in the same work piece. As far as the die element 14 of the tool set is concerned, this is not a difficult problem for it may be keyed in place readily as seen at 14' in FIG. 7, and arranged above a lifter sleeve 49 for quick dislodgment whenever a change is necessary. The punch element 13 is not so easily handled, however, for it must not only be aligned with respect to a central axis, but it must also have X-Y alignment when its shape is anything other than circular, such as is indicated at 13' in FIGS. 13 and 14, and alignment of this sort requires a counter-part of the keying that is done with the die element 14.

It is usual for this purpose to form a flat 13" at the shank of the punch element 13' that reflects the necessary X-Y alignment, and then install the punch element 13' so that it is held in relation to this flat; but such practice normally requires a special and tedious installation procedure to effect the required positioning properly in this way. The present invention provides a tool holder 50, as shown in FIGS. 10, 11 and 12, by which such positioning results as a matter of course during a simple procedure of merely placing the punch element 13' in the holder 50 and tightening the holder structure to grip it.

As seen in FIGS. 10, 11 and 12, the holder 50 is formed with a neck portion 51 at which it may be set and held in the punch press crosshead 12. This neck portion 51 is assembled with a body member 52 that in turn carries an opposing pair of jaw members 53 and 54 slidably between a rear slideway block 55 and a pair of front slideway blocks 56 and 57, and beneath a top slide plate 58. The front slideway blocks 56 and 57 are fitted with an adjusting screw 59 having an adjusting head 60 positioned and contained between them, and also having respective oppositely threaded left and right hand portions 61 and 62 extending therefrom to engage positioning arms 63 and 64 reaching from the respective jaw members 53 and 54.

The jaw members 53 and 54 act to grip and hold a punch element 13' at complementary flat-sided recesses 65 and 66 proportioned to grip a range of punch sides at the conventionally cylindrical shank thereof, while being upwardly relieved or chambered at 65' and 66' to receive the equally conventional enlarged punch head. In addition, one of the jaw members 53 is fitted with a plunger 67 that is backed-up by a biasing means, as indicated at 68 in FIG. 12, causing it to project retractably in the recess 65 of this jaw member 53 for orienting any alignment flat 13" on the shank of the punch element 13' being installed.

If there is no alignment flat on a particular punch element being handled, then the plunger 67 is simply displaced against its bias 68 and the jaw members 53 and 54 operate as if the plunger were not present. The biasing means 68 may be a spring or it can be provided effectively as a block of relatively dense plastic foam. It should also be noted that the right and left hand portions 61 and 62 of the screw member 59 are phased so that the jaw members 53 and 54 are adjusted synchronously in relation to the position that must be assumed by the central axis of the punch element being installed.

The present invention has been described in detail above for purposes of illustration only and is not intended to be limited by this description or otherwise except as defined in the appended claims.

I claim:

1. Means of the character described including: a punch press having a crosshead thereof fitted with a tool holder for carrying the punch element of a tool set installed in said press, said tool holder comprising an opposed pair of slidable holding jaws formed with complementary flat-sided recesses for gripping a cylindrical punch element shank and positioned synchronously by screw means commonly engaging said jaws for adjustment thereof in relation to a fixed position to be assumed by the central axis of a punch element to be carried, and one of said holding jaws having a plunger installed therein under a bias causing it to project retractably in the recess of said jaws for orienting any alignment flat provided on said cylindrical punch element shank; a work holding fixture for holding work of sheet form at said punch press in relation to said tool set, said fixture comprising a fixed corner gauging element and a plurality of edge clamping means aligned in spaced relation from said corner gauging element for square positioning of an edge of said work sheet with respect thereto, said edge clamping means being formed with a positioning shoe presenting a supporting face terminating at an abutment shoulder, each having a clamping finger pivoted therein for gripping a work sheet edge portion against the supporting face of said shoe in a manner tending to urge the adjacent edge of said work sheet against said abutment shoulder, and each including means for actuating said pivoted clamping finger to grip said work sheet; and supporting means located adjacent said punch press and carrying said work holding fixture to dispose work in relation to said tool set, said supporting means being shiftable for coordinate positioning of said work holding fixture and work held thereby in relation to said punch press, and means for controlling the shifting of said supporting means so that a desired coordinate positioning of said work is obtained.

2. Means of the character described including a punch press having a crosshead thereof fitted with a tool holder for carrying the punch element of a tool set installed in said press, said tool holder comprising an opposed pair of slidable holding jaws formed with complementary flat-sided recesses for gripping a cylindrical punch element shank and positioned synchronously by screw means commonly engaging said jaws for adjustment thereof in relation to a fixed position to be assumed by the central axis of a punch element to be carried, and one of said holding jaws having a plunger installed therein under a bias causing it to project retractably in the recess of said jaws for orienting any alignment flat provided on said cylindrical punch element shank, and work positioning means comprising a work holding fixture, supporting means adjacent said punch press carrying said fixture to dispose work in relation to the tool fitting of said punch press, said supporting means being shiftable for coordinate positioning of said fixture and work held thereby in relation to said punch press, and means for controlling the shifting of said supporting means so that a desired coordinate positioning of said work is obtained.

3. Work positioning means for holding and positioning work of sheet form comprising, in combination with a tool-fitted work conforming unit, a work holding fixture including a corner gauging element fixed thereto and a plurality of edge clamping means aligned in spaced relation from said corner gauging element for square positioning of an edge of said work sheet with respect thereto, said edge clamping means each being formed with a positioning shoe presenting a supporting face terminating at an abutment shoulder, each having a clamping finger pivoted thereon for gripping a work sheet edge portion against the supporting face of said shoe in a manner tending to urge the adjacent edge of said work sheet against said abutment shoulder, and each including means for actuating said pivoted clamping finger to grip said work sheet, supporting means adjacent said work conforming unit carrying said fixture to dispose work in relation to the tool fitting of said unit, said supporting means being shiftable for coordinate positioning of said fixture and work held thereby in relation to said tool fitting, and means for controlling the shifting of said supporting means so that a desired coordinate positioning of said work is obtained.

4. Work positioning means as defined in claim 3 and further characterized in that said work conforming unit includes a work supporting table having a work aligning plate member hinged therein on axis extending right angularly with respect to the alignment of the edge clamping means of said work holding fixture, in that said hinged plate member is biased for normally assuming a flush disposition with respect for said work supporting table, in that actuating means is provided for selectively displacing said hinged plate member to a raised position presenting an edge thereof for square positioning of an edge of said work sheet thereat in preparation for gripping of said work sheet by said holding fixture, and in that said last mentioned actuating means is controlled so as to be disabled upon operation of the means for actuating the pivoted clamping fingers of said holding fixture.

References Cited by the Examiner

UNITED STATES PATENTS

| | | | |
|---|---|---|---|
| 512,829 | 1/1894 | Hunter | 83—412 |
| 895,944 | 8/1908 | Bernard | 83—413 |
| 1,008,926 | 11/1911 | Saylor | 279—112 X |
| 1,097,036 | 5/1914 | Lister et al. | 279—112 X |
| 1,195,538 | 8/1916 | Wadhams | 83—699 |
| 1,219,935 | 3/1917 | Gorton | 269—238 X |
| 1,514,647 | 11/1924 | Bowen | 83—699 |
| 2,431,566 | 11/1947 | Kopczynski | 83—686 |
| 2,875,718 | 3/1959 | Bieri et al. | 269—25 |
| 2,896,487 | 7/1959 | Seale | 269—25 |
| 3,043,586 | 7/1962 | Boule | 83—461 X |
| 3,134,284 | 5/1964 | Kidd | 83—413 |

FOREIGN PATENTS 476,992   9/1951   Canada.

ANDREW R. JUHASZ, *Primary Examiner.*

WILLIAM W. DYER, JR., *Examiner.*

J. B. McGUIRE, *Assistant Examiner.*